United States Patent
Luo et al.

(10) Patent No.: US 11,418,704 B2
(45) Date of Patent: Aug. 16, 2022

(54) SCALED PERSPECTIVE ZOOM ON RESOURCE CONSTRAINED DEVICES

(71) Applicant: Snap Inc., Santa Monica, CA (US)

(72) Inventors: Linjie Luo, Los Angeles, CA (US); Chongyang Ma, Los Angeles, CA (US); Zehao Xue, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/933,314

(22) Filed: Jul. 20, 2020

(65) Prior Publication Data
US 2021/0037179 A1    Feb. 4, 2021

Related U.S. Application Data

(62) Division of application No. 15/624,277, filed on Jun. 15, 2017, now Pat. No. 10,757,319.

(51) Int. Cl.
*H04N 5/232* (2006.01)
*H04N 5/262* (2006.01)
*H04N 5/272* (2006.01)

(52) U.S. Cl.
CPC ..... *H04N 5/23216* (2013.01); *H04N 5/23219* (2013.01); *H04N 5/23267* (2013.01); *H04N 5/23293* (2013.01); *H04N 5/2628* (2013.01); *H04N 5/272* (2013.01)

(58) Field of Classification Search
None
See application file for complete search history.

(56) References Cited

U.S. PATENT DOCUMENTS

| | | | |
|---|---|---|---|
| 8,358,691 B1 | 1/2013 | Wang et al. | |
| 10,402,689 B1 | 9/2019 | Bogdanovych et al. | |
| 10,757,319 B1 | 8/2020 | Luo et al. | |
| 10,776,663 B1 | 9/2020 | Bogdanovych et al. | |
| 2011/0090303 A1* | 4/2011 | Wu | H04N 5/23267 348/14.16 |
| 2011/0103695 A1* | 5/2011 | Sato | G06K 9/4604 382/190 |
| 2014/0003719 A1 | 1/2014 | Bai et al. | |
| 2014/0240553 A1* | 8/2014 | Pylvanainen | H04N 5/2628 348/240.2 |
| 2016/0057353 A1* | 2/2016 | Tuulos | H04N 5/23287 348/208.99 |
| 2016/0154993 A1 | 6/2016 | Aarabi | |

(Continued)

OTHER PUBLICATIONS

U.S. Appl. No. 15/706,057 U.S. Pat. No. 10,402,689, filed Sep. 15, 2017, Generating an Image Mask Using Machine Learning.

(Continued)

*Primary Examiner* — Mark T Monk
(74) *Attorney, Agent, or Firm* — Schwegman Lundberg & Woessner, P.A.

(57) ABSTRACT

A dolly zoom effect can be applied to one or more images captured via a resource-constrained device (e.g., a mobile smartphone) by manipulating the size of a target feature while the background in the one or more images changes due to physical movement of the resource-constrained device. The target feature can be detected using facial recognition or shape detection techniques. The target feature can be resized before the size is manipulated as the background changes (e.g., changes perspective).

20 Claims, 17 Drawing Sheets

(56) References Cited

U.S. PATENT DOCUMENTS

| | | | |
|---|---|---|---|
| 2016/0373828 A1* | 12/2016 | Seol | H04N 21/8549 |
| 2017/0061258 A1 | 3/2017 | Chen et al. | |
| 2019/0066279 A1 | 2/2019 | Monkarsh | |
| 2021/0000271 A1 | 1/2021 | Bogdanovych et al. | |

OTHER PUBLICATIONS

U.S. Appl. No. 16/521,956 U.S. Pat. No. 10,776,663, filed Jul. 25, 2019, Generating an Image Mask Using Machine Learning.

U.S. Appl. No. 16/992,968, filed Aug. 13, 2020, Generating an Image Mask Using Machine Learning.

U.S. Appl. No. 15/624,277 U.S. Pat. No. 10,757,319, filed Jun. 15, 2017, Scaled Perspective Zoom on Resource Constrained Devices.

"U.S. Appl. No. 15/624,277, Examiner Interview Summary dated Feb. 15, 2019", 3 pgs.

"U.S. Appl. No. 15/624,277, Examiner Interview Summary dated Mar. 11, 2020", 3 pgs.

"U.S. Appl. No. 15/624,277, Final Office Action dated Sep. 17, 2019", 18 pgs.

"U.S. Appl. No. 15/624,277, Non Final Office Action dated Apr. 2, 2019", 15 pgs.

"U.S. Appl. No. 15/624,277, Notice of Allowance dated Apr. 13, 2020", 12 pgs.

"U.S. Appl. No. 15/624,277, Response filed Mar. 11, 2020 to Final Office Action dated Sep. 17, 2019", 13 pgs.

"U.S. Appl. No. 15/624,277, Response filed Jul. 2, 2019 to Non Final Office Action dated Apr. 2, 2019", 14 pgs.

"U.S. Appl. No. 15/624,277, Response filed Feb. 11, 2019 to Restriction Requirement dated Aug. 10, 2018", 6 pgs.

"U.S. Appl. No. 15/624,277, Restriction Requirement dated Aug. 10, 2018", 6 pgs.

"U.S. Appl. No. 15/706,057, Notice of Allowance dated Apr. 18, 2019", 16 pgs.

"U.S. Appl. No. 16/521,956, Corrected Notice of Allowability dated Jul. 2, 2020", 4 pgs.

"U.S. Appl. No. 16/521,956, Non Final Office Action dated Sep. 12, 2019", 16 pgs.

"U.S. Appl. No. 16/521,956, Notice of Allowance dated May 6, 2020", 16 pgs.

"U.S. Appl. No. 16/521,956, Response filed Feb. 12, 2020 to Non Final Office Action dated Sep. 12, 2019", 13 pgs.

"U.S. Appl. No. 16/992,968, Preliminary Amendment filed Oct. 20, 2020", 7 pgs.

He, Kaiming, et al., "Mask R-CNN", Proc. of the IEEE Intl. Conference on Computer Vision (ICCV), (2017), 2961-2969.

* cited by examiner

SCALED PERSPECTIVE ZOOM ON RESOURCE CONSTRAINED DEVICES

CROSS REFERENCE TO RELATED APPLICATION

This application is a divisional of U.S. patent application Ser. No. 15/624,277, filed on Jun. 15, 2017, which is incorporated herein by reference in its entirety.

TECHNICAL FIELD

Embodiments of the present disclosure relate generally to image capture computing technology and, more particularly, but not by way of limitation, to performing scaled perspective zoom on devices with imaging capturing systems.

BACKGROUND

A dolly zoom is an effect made popular in movies such as Jaws. The effect is generally accomplished by moving an image capture device farther away from or closer to the subject while a zooming lens zooms in or out to keep the subject the same size. The result of a dolly zoom is a dramatic change in the background that makes the background seem as if it is enveloping the subject or rapidly zooming off to the distance. While the effect is known, it typically requires a sophisticated imaging setup that uses a dolly to move the image capture device while a zoom lens is adjusted in concert. Accordingly, users have not been able to use the effect with their resource-constrained devices (mobile devices such as smartphones) that have limited processing power, and further do not have a zoom system or a dolly system.

BRIEF DESCRIPTION OF THE SEVERAL VIEWS OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
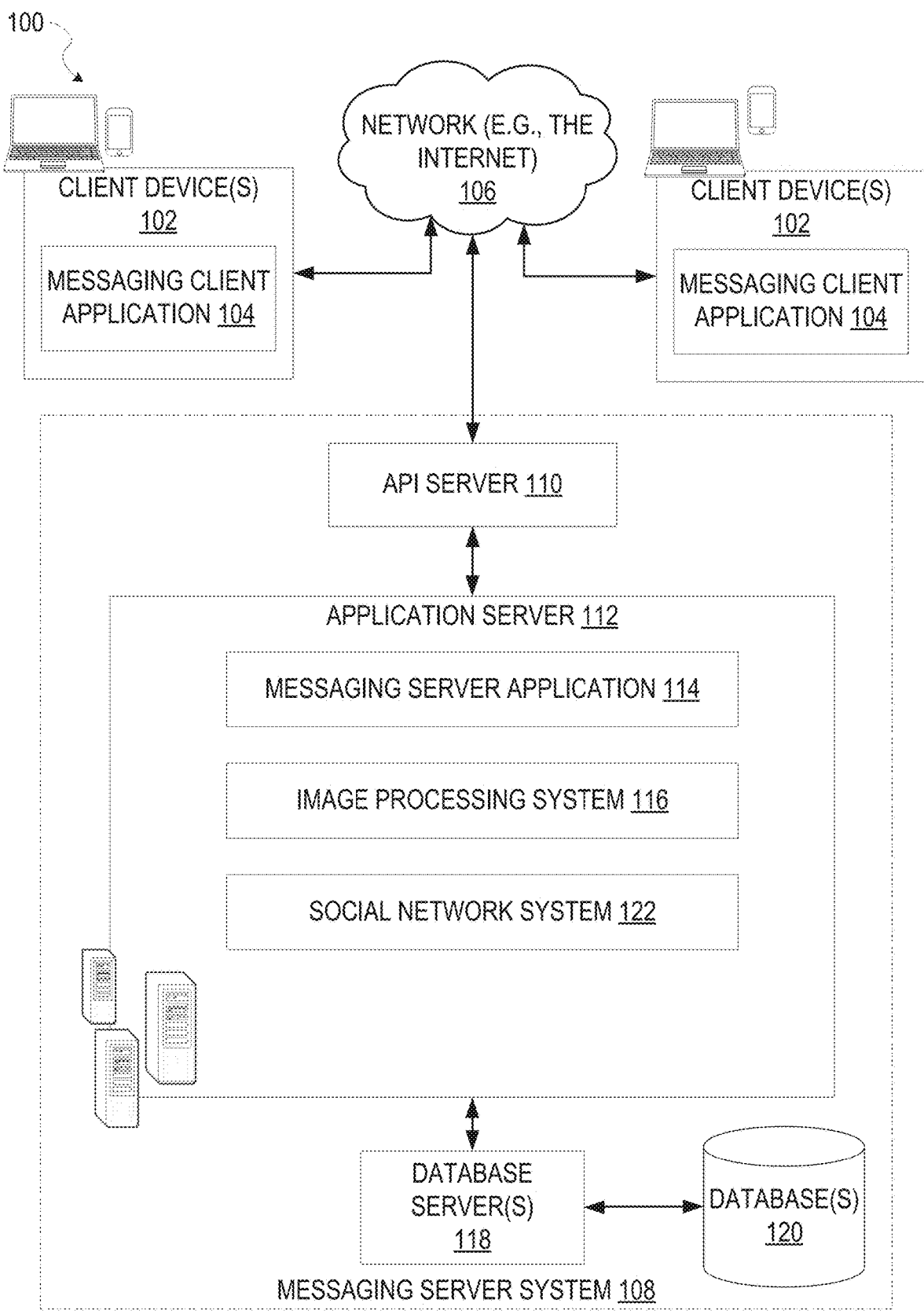
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Dolly zoom is a complex camera effect achieved by using a zoom to adjust the angle of view of a captured image while the point of view moves toward or away from the subject to keep the subject the same size in the frame. For a camera system, this generally requires a dolly or guidance system and a zoom lens that work in concert to produce a zooming effect. An example of the dolly zoom effect can be found in movies such as Jaws and Goodfellas. Performing a dolly zoom effect on a resource-constrained device, such as a smartphone, is generally not possible because the device has limited resources, such as processing power and memory, usually required for complex video processing. Further, the devices lack resources such as a dolly or guidance system and a zoom system (e.g., zoom lens) that can work in concert (e.g., work in concert to produce a dolly zoom effect).

A scaled perspective zoom effect can be implemented on resource-constrained devices to perform a dolly zoom-like effect. According to some example embodiments, a client device (e.g., smartphone) may display a live video feed of video being captured by a camera of the client device. The live video feed may display a subject (e.g., a person) in front of a background (e.g., a grassy field with trees). The user of the client device may select the person as a target feature by tapping on the depiction of the person in the live video feed. The client device is configured to receive the tapping motion and detect the person as the target feature, according to some example embodiments. The client device may provide a mesh over the person's face to track the person's face in the live video feed. The client device is then physically moved towards the person. The physical movement of the client device towards the person causes the perspective of both the foreground person and the background (e.g., the grassy field with trees) to change. As the client device records the person and background while moving towards the person, the client device keeps the size of the person as displayed in the live video feed the same. The resulting effect of changing the perspective of the background while maintaining the size of the person produces a type of dolly zoom effect that works well on resource-constrained devices. The above description is a high-level example embodiment; further example embodiments are discussed in detail below with reference to the figures.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 106 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening and application events (e.g., relating to the messaging client application 104).

The application server 112 hosts a number of applications and subsystems, including the messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following", and also the identification of other entities and interests of a particular user.

The application server 112 is communicatively coupled to a database server 118, which facilitates access to a database 120 in which is stored data associated with messages processed by the messaging server application 114.

Figure 2:
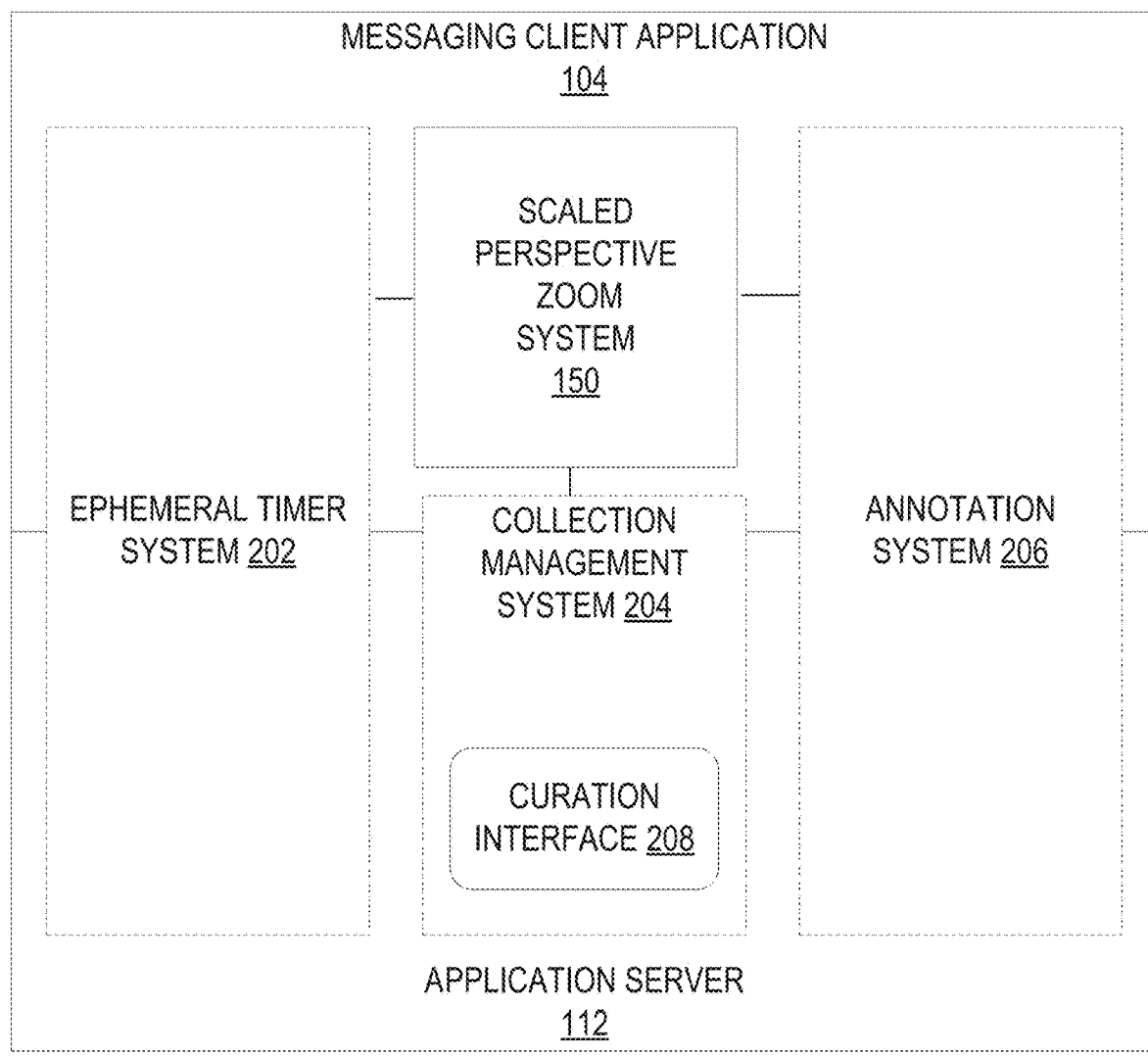
FIG. 2 is block diagram illustrating further details regarding a messaging system having an integrated scaled perspective zoom system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a scaled perspective zoom system 150. The scaled perspective zoom system 150 is discussed in further detail below.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story". Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which particular content should be offered to other users. The annotation system 206 generates a media overlay that includes the uploaded content and associates the uploaded content with the selected geolocation.

Figure 3:
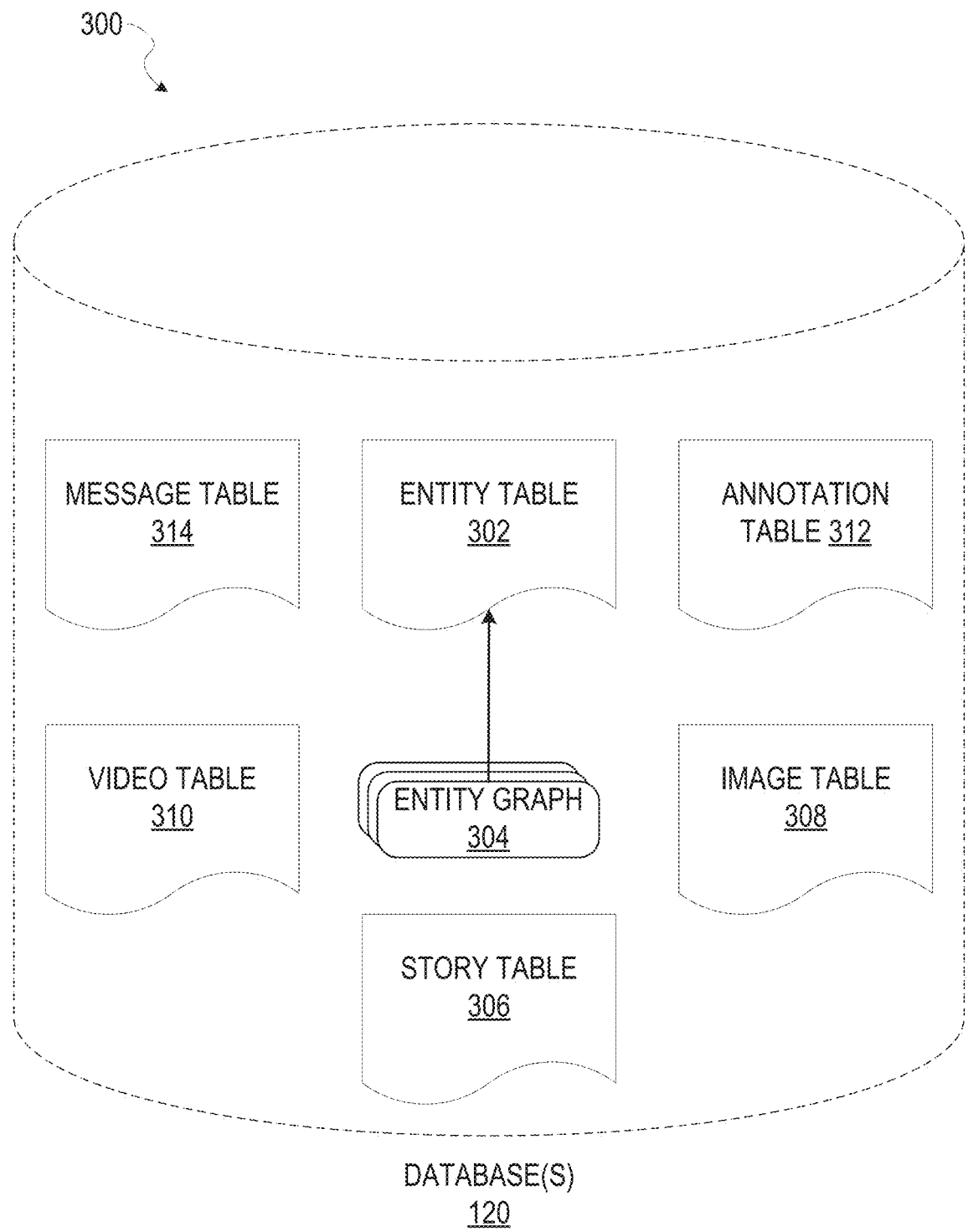
FIG. 3 is a schematic diagram illustrating data which may be stored in a database of a messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story", which is a collection of content from multiple users that is created manually, automatically, or using a combination of manual and automatic techniques. For example, a "live story" may constitute a curated stream of user-submitted content from various locations and events. Users whose client devices have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
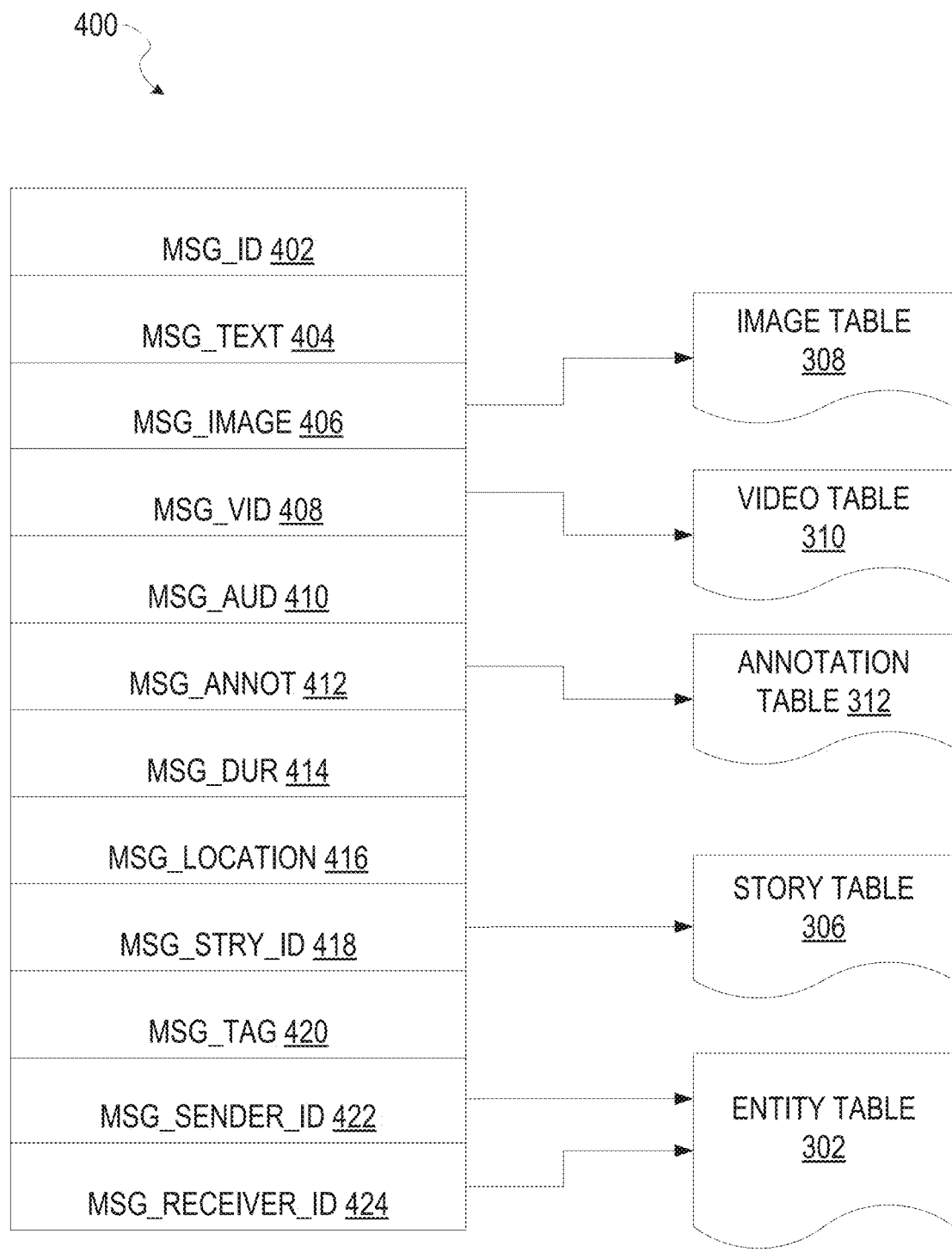
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102, and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102, and that is included in the message 400.

A message audio payload 410: audio data, captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
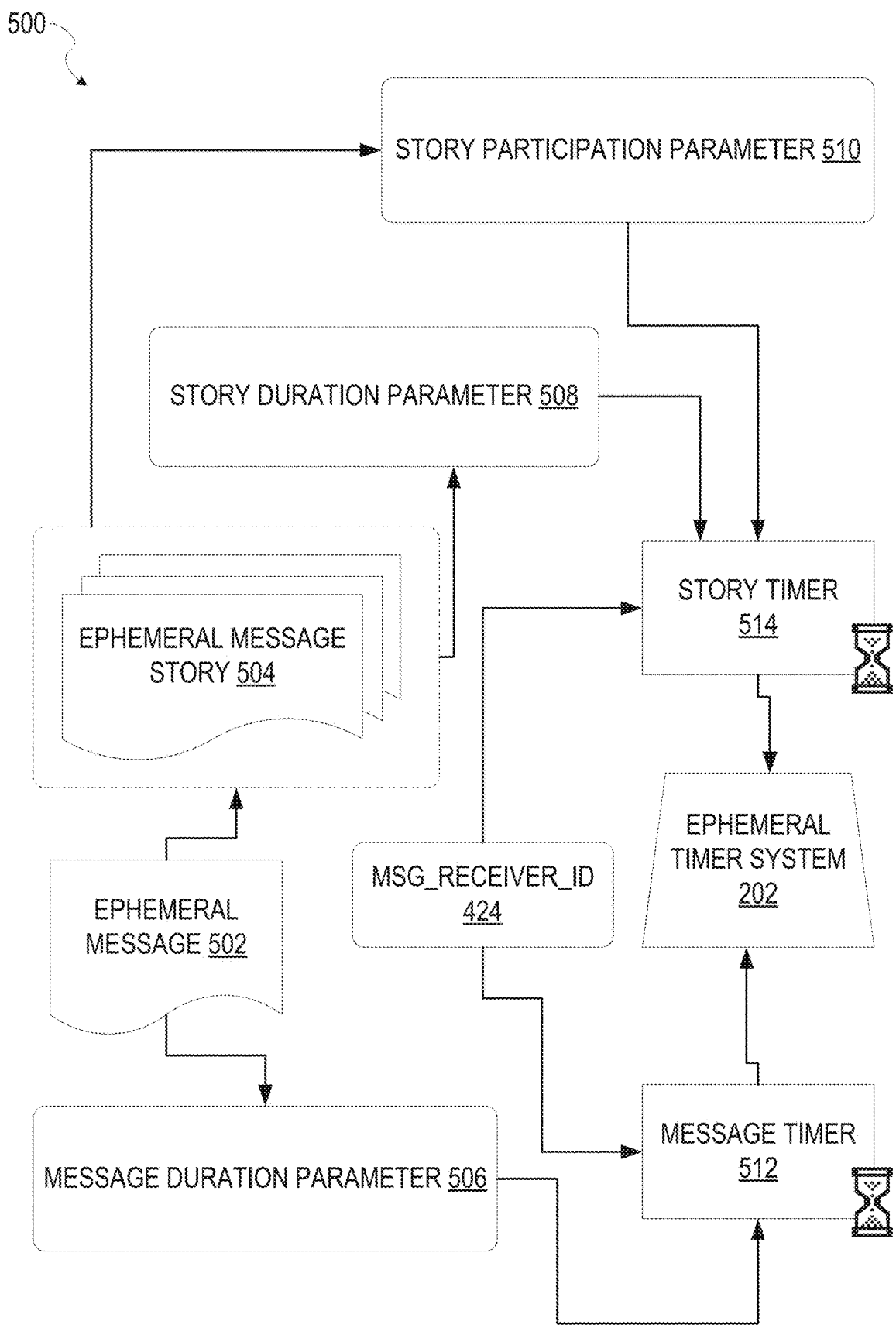
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
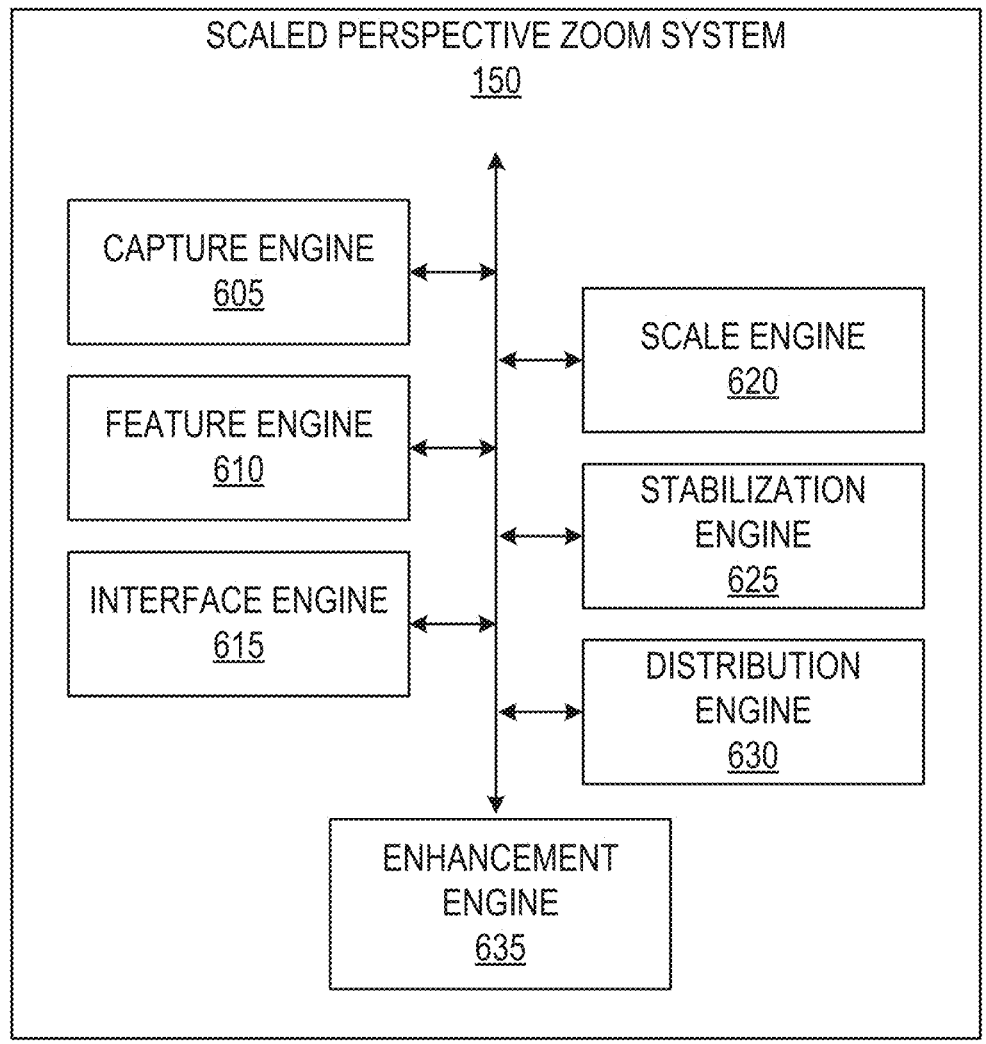
FIG. 6 displays an example functional architecture of a scaled perspective zoom system, according to some example embodiments.

FIG. 6 shows a functional architecture for a scaled perspective zoom system 150, according to some example embodiments. As illustrated, the scaled perspective zoom system 150 comprises a capture engine 605, a feature engine

610, an interface engine 615, a scale engine 620, a stabilization engine 625, a distribution engine 630, and an enhancement engine 635. The capture engine 605 manages interfacing with an image sensor (e.g., CMOS, CCD) integrated into a client device to capture one or more images (e.g., a live feed). The feature engine 610 is configured to detect a subject depicted within one or more images as a target feature. The interface engine 615 is configured to receive inputs from a user of the client device. For example, the interface engine 615 may receive a user input (e.g., a gesture such as a two-finger tap, a button click) from the user that indicates that the user seeks to assign a given object as a target object, as discussed in further detail below. The scale engine 620 is responsible for managing the scale (e.g., apparent size) of the target feature. For example, as the client device moves closer to or farther away from the subject, the apparent size of the subject may change. To compensate for the change, the scale engine 620 may maintain the scale of the target feature so that it appears that the target feature is maintaining the same size. The stabilization engine 625 is configured to stabilize the target feature within the one or more images as the client device physically moves. The distribution engine 630 is configured to save the one or more images capturing the scaled perspective zoom effect to local memory. Further, the distribution engine 630 is configured to transmit the one or more images capturing the scaled perspective zoom effect to a social networking service (e.g., publish the one or more images as an ephemeral message 502). The enhancement engine 635 is configured to modify the background of the one or more images. For example, the background may be replaced with a computer-generated background, which is saved with the one or more images.

Figure 7:
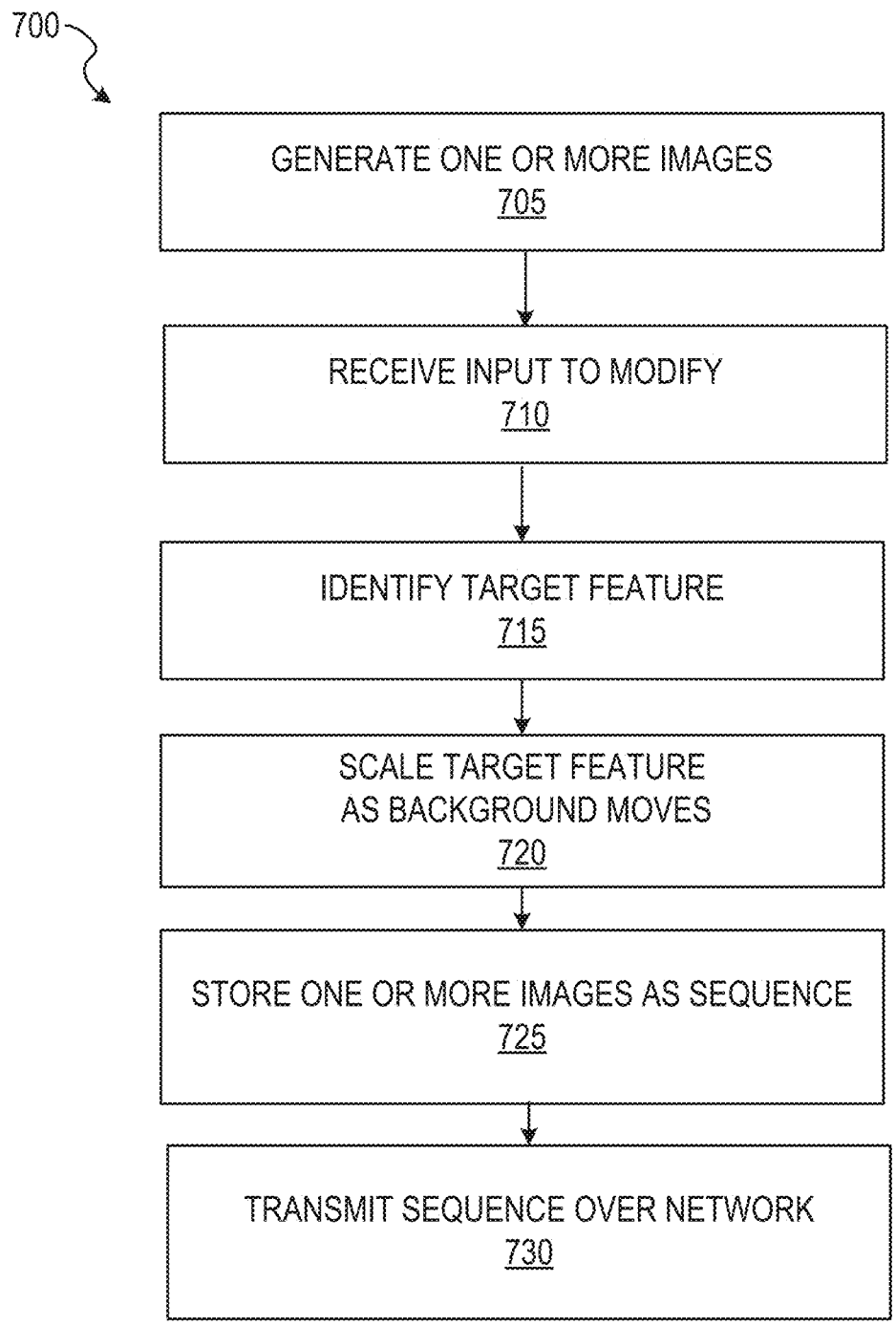
FIG. 7 shows a flow diagram of a method for scaling a feature as the background changes (e.g., changes perspective), according to some example embodiments.

FIG. 7 shows a flow diagram of a method 700 for generating a scaled perspective zoom effect on one or more images, according to some example embodiments. At operation 705, the capture engine 605 captures one or more images using an image sensor of the client device 102. For example, the one or more images may be a live video feed displayed on a screen of the client device 102 in real time as the images are captured. At operation 710, the interface engine 615 receives an input to modify a subject depicted in the one or more images. For example, the user may tap and hold his/her finger on a person's face depicted in the live video feed on the display screen of the client device 102. At operation 715, in response to the input, the feature engine 610 identifies a target feature in the one or more images. For example, the feature engine 610 may initiate face detection on the one or more images in the area indicated by the input (e.g., over the person's face). At operation 720, the scale engine 620 scales the target feature as the background moves. For example, once the face is detected, and while the user keeps his/her finger pressed on the person's depicted face, the user can move the client device 102 farther away from the person. As the client device 102 moves farther away, the apparent size of the person's face will decrease in the live video feed. However, as the person's face has been detected by the feature engine 610, the scale engine 620 can maintain the apparent size of the person's face, even as the client device 102 moves away. The resulting effect is a scaled perspective zoom as the target feature maintains its size while the perspective of the background changes. In this way, a client device can implement a scaled perspective zoom effect without a guidance system (e.g., dolly) or a controlled zoom.

Further, according to some example embodiments, the client device is equipped with a zoom system (e.g., physical zoom lens) that the user can implement in operation 720. For example, once the target feature is detected, the size of the target feature can be maintained as the user moves the camera while adjusting the zooming system. The resulting effect can produce different types of dolly zoom effects, according to some example embodiments.

At operation 725, the distribution engine 630 stores the one or more images that capture the perspective zoom effect. For example, the distribution engine 630 stores the one or more images as a zoom sequence to a local memory of the client device 102. At operation 730, the distribution engine 630 transmits the one or more images that capture the perspective zoom effect over a network. For example, the distribution engine 630 may publish the zoom sequence to the social network system 122 from the social network system user profile of the user. In some example embodiments, the zoom sequence is published as an ephemeral message 502 within an ephemeral message story 504, as discussed above with reference to FIG. 5.

Figure 8:
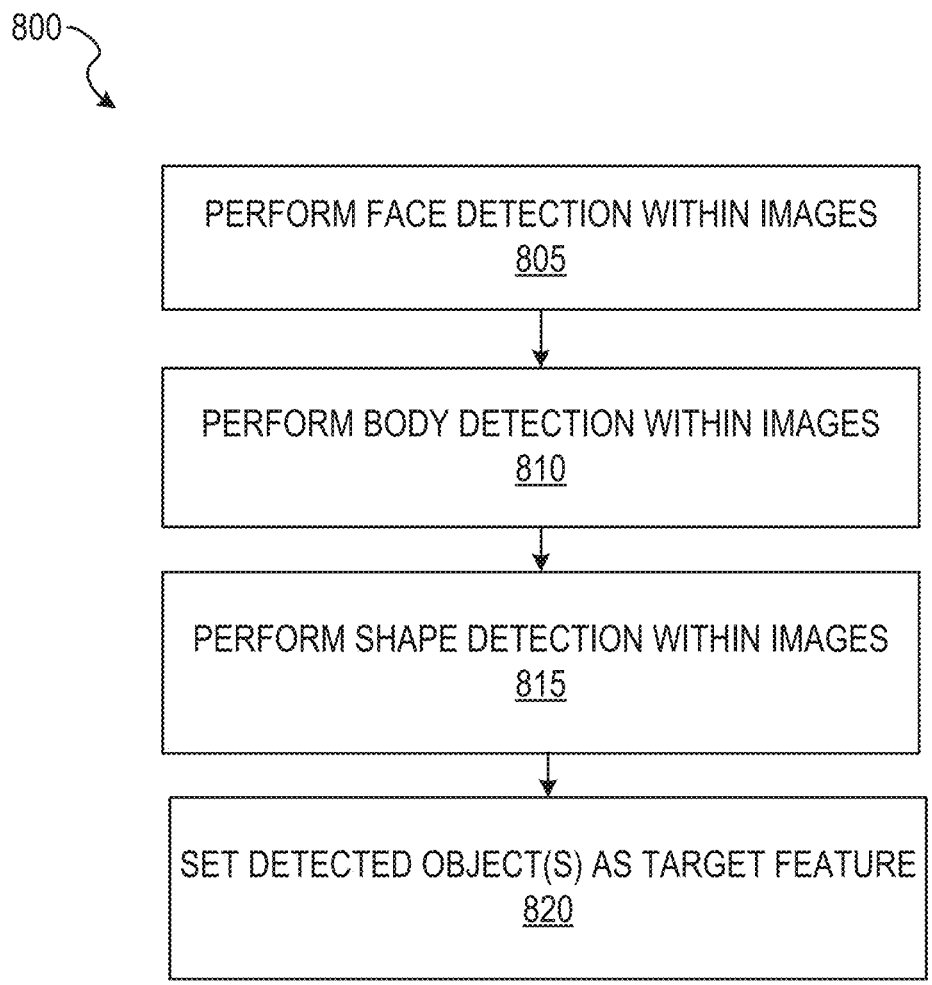
FIG. 8 shows a flow diagram of a method for detecting one or more target features, according to some example embodiments.

FIG. 8 shows a flow diagram of a method 800 for identifying one or more target features, according to some example embodiments. One or more of the operations of the method 800 can be performed as sub-routines of operation 715 in FIG. 7. At operation 805, the feature engine 610 identifies one or more features by performing face detection within the one or more images. For example, the feature engine 610 may implement the Viola-Jones algorithm to detect the face, and use points on the face to create a mesh that tracks the face in each of the one or more images. At operation 810, the feature engine 610 identifies one or more features by performing body detection within the one or more images. For example, the feature engine 610 may use a convolutional neural network to detect a person's body, and further break up the person's body into labeled segments, as discussed in further detail below. Further details regarding body detection are described in Provisional Application Ser. No. 62/481,415, titled "GENERATING A PIXEL MASK USING MACHINE LEARNING", filed on Apr. 4, 2017, which is hereby incorporated by reference in its entirety.

At operation 815, the feature engine 610 identifies one or more features by performing shape detection within the one or more images. For example, the feature engine 610 may implement edge detection to determine the outline of an object. At operation 820, the feature engine 610 sets the features detected within at least one of the operations 805-815 as the target feature. Is to be appreciated that although the example method 800 displays all of the operations 805-815 being implemented, in some example embodiments one or more of the operations 805-815 are implemented depending on how the feature engine 610 is configured. For example, in some example embodiments, the feature engine 610 is configured with only face-detection capabilities. In those example embodiments, in response to a user tapping on a face in the one or more images, the feature engine 610 performs face detection as discussed above, and body and shape detection may never occur. Further, in some example embodiments, one of the feature detection operations (operations 805-815) may complement or enhance the result of another feature detection operation. For example, at operation 805 face detection may detect a person's face and track it using a mesh, and operation 810 may be skipped. Then, at operation 815, the feature engine 610 may perform shape detection to detect the neck and shoulders of the person. Finally, at operation 820, the face, neck, and shoulders may all be set as the target feature.

Figure 9:
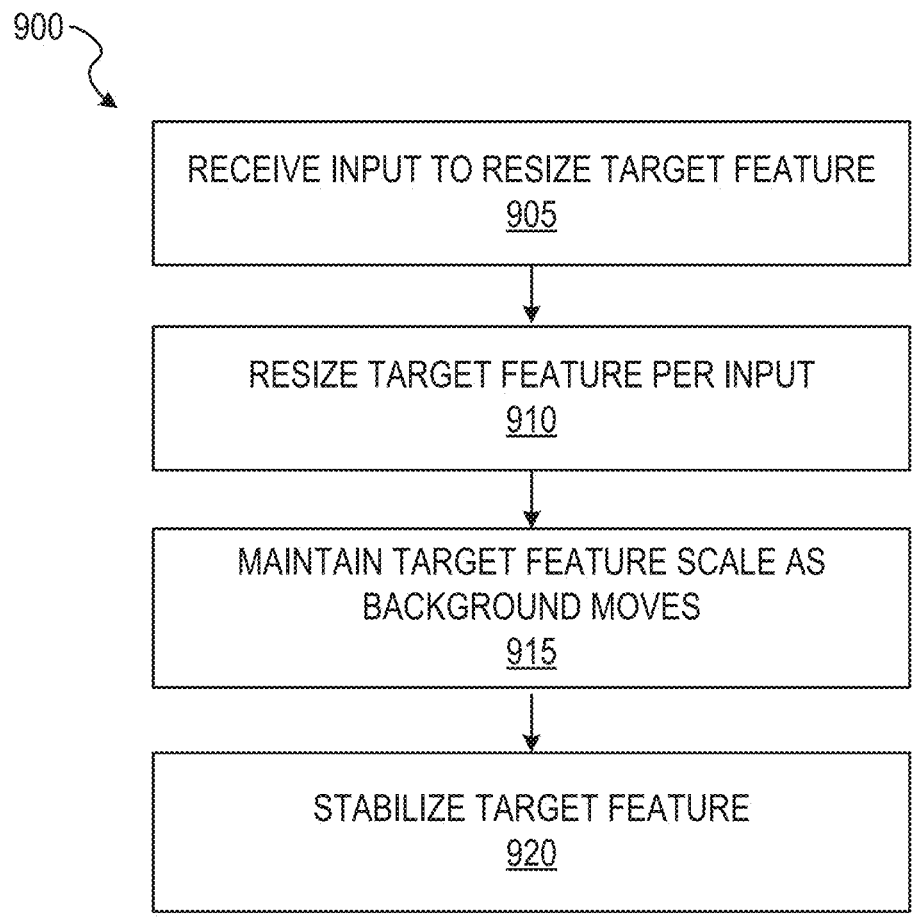
FIG. 9 shows a flow diagram of a method for manipulating a target feature as a background changes (e.g., changes perspective), according to some example embodiments.

FIG. 9 shows a flow diagram of a method 900 for scaling a target feature in the one or more images, according to some example embodiments. One or more of the operations of the method 900 can be performed as sub-routines of operation 720 in FIG. 7. At operation 905, the interface engine 615 receives an input to resize the target feature (e.g., increase or decrease the size). For example, the user performs a pinch-and-zoom-in gesture on the target feature to indicate that he/she seeks to enlarge the target feature. At operation 910, the scale engine 620 resizes the target feature according to the input. For example, the scale engine 620 uses a mesh of a face to enlarge the size of the face on the display screen of the client device.

At operation 915, the scale engine 620 maintains the size (e.g., the enlarged size) of the target feature as the background moves. For example, at operation 915, the client device is moved closer to the depicted subject while the live feed is centered on the depicted subject, thereby causing the background to move in the one or more images. Thus, in the live feed, the background changes its perspective due to physical movement of the client device. Further, due to the target feature being enlarged, as the depicted subject's apparent size grows due to the client device moving closer, the enlarged target feature covers the growing depicted subject.

Although the example method 900 implements resizing of the target feature, in some example embodiments, the target feature is not initially resized before the background moves. That is, in an initial frame of the live feed, the target feature is detected and its initial size upon being detected is maintained at operation 915 as the background moves. This approach may be implemented, for example, when the increasing or decreasing apparent size of the depicted image due to the client device moving is negligible.

The size of the target feature can be pixel size of the target feature in the one or more images, according to some example embodiments. Further, the initial size of the target feature may be a percentage of the total image size (e.g., an image frame of the live feed), according to some example embodiments. For example, the initial size of the target feature may be 30% of the height of the image frame of the live feed. As the background is moved, the target feature's dimensions are manipulated to remain at 30% of the image frame even though the apparent size of the depicted object may be changing due to the client device moving closer or farther away.

At operation 920, the stabilization engine 625 stabilizes the target feature in its initial area (e.g., the center of the one or more images) as the background moves (e.g., due to the client device moving closer to the depicted subject). Stabilization of the target feature helps maintain the smoothness of the scaled perspective zoom effect in the absence of a dolly guidance system. In some example embodiments, the stabilization engine 625 performs stabilization by keeping the target feature in the center of the one or more images with respect to edges of the images. In some example embodiments, the stabilization engine 625 performs stabilization by keeping the position of the target feature constant with respect to an object detected in the one or more images. For example, if in an initial image the face is 50 pixels to the left of a tree, the stabilization engine 625 repositions the target feature such that it stays 50 pixels to the left of the tree in each image of the live feed.

Although the above discussion of the method 900 uses an enlarged target feature example (e.g., enlarging in response to a pinch-and-zoom-in gesture), it is to be appreciated that a corresponding approach can be implemented using a decreased-size target feature. In those embodiments, for example, at operation 905 the user decreases the size by using a pinch-and-zoom-out gesture.

Figure 10:
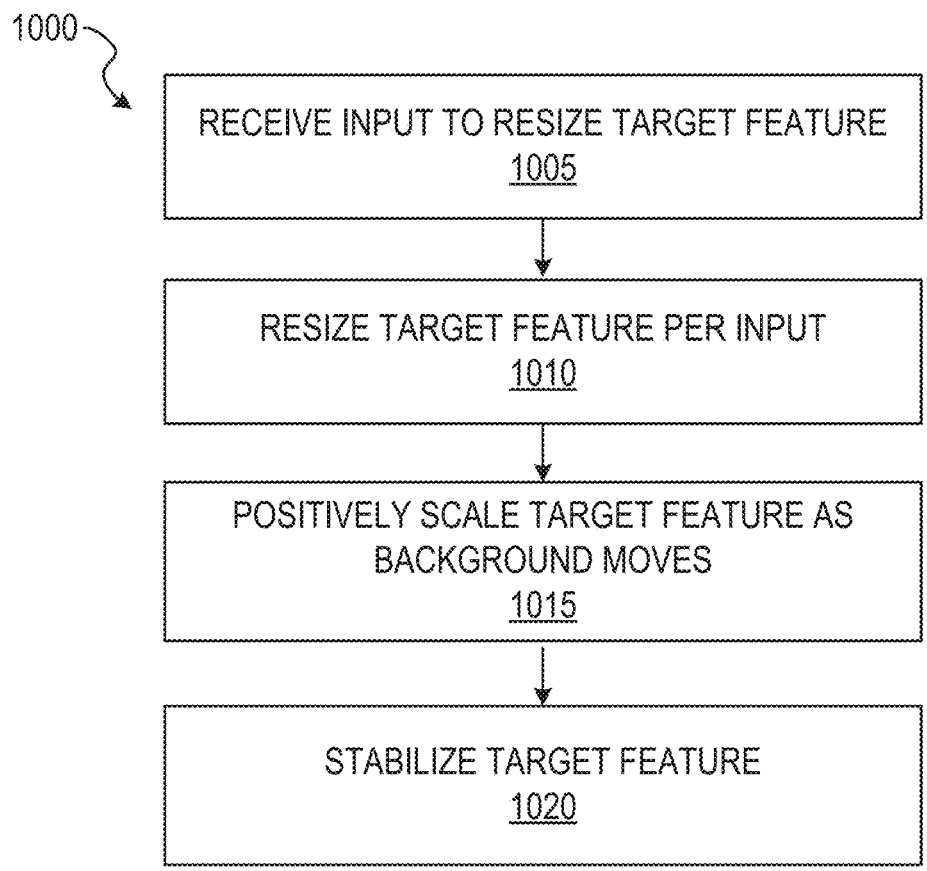
FIG. 10 shows a flow diagram of a method for manipulating a target feature as a background changes (e.g., changes perspective), according to some example embodiments.

FIG. 10 shows a flow diagram of a method 1000 for positively scaling a target feature in the one or more images, according to some example embodiments. One or more of the operations of the method 1000 can be performed as sub-routines of operation 720 in FIG. 7. The method 1000 is similar to the method 900 except that instead of being maintained as the background moves (e.g., due to the client device physically moving), the target feature's size is increased progressively in each subsequent frame of the live feed as the background moves. This approach, e.g., the method 1000, can increase the effect of the scaled perspective zoom. Accordingly, at operation 1005, the interface engine 615 receives an input to resize the target feature (e.g., receives an input to increase or decrease the initial size of the target feature). At operation 1010, the scale engine 620 resizes the target feature according to the input. At operation 1015, the scale engine 620 positively scales the target feature so that the size of the target feature increases as the background moves (e.g., due to the client device moving). At operation 1020, the stabilization engine 625 stabilizes the target feature in its location (e.g., the center of the one or more images) as the background moves.

Figure 11:
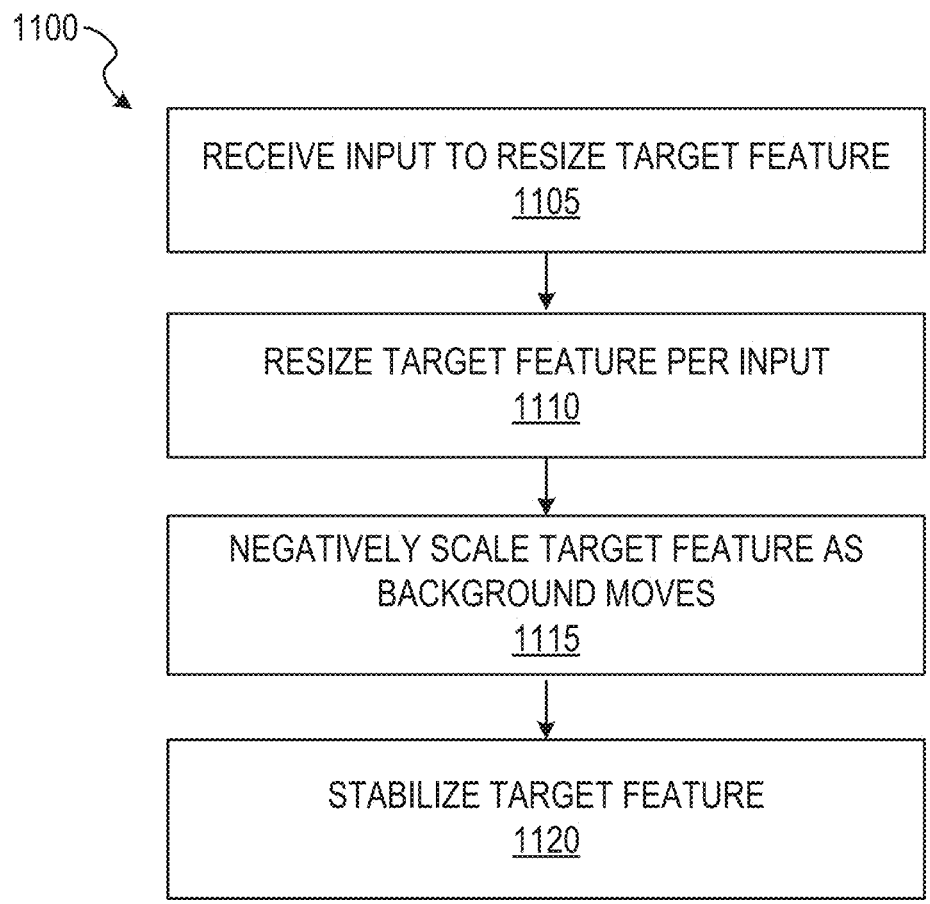
FIG. 11 shows a flow diagram of a method for manipulating a target feature as a background changes (e.g., changes perspective), according to some example embodiments.

FIG. 11 shows a flow diagram of a method 1100 for negatively scaling a target feature in the one or more images, according to some example embodiments. One or more of the operations of the method 1100 can be performed as sub-routines of operation 720 in FIG. 7. The method 1100 is similar to the method 900 except that instead of being maintained as the background moves (e.g., due to the client device physically moving), the target feature's size is decreased progressively in each subsequent frame of the live feed as the background moves. This approach, e.g., the method 1100, can increase the effect of the scaled perspective zoom. At operation 1105, the interface engine 615 receives an input to resize the target feature, as discussed above. At operation 1110, the scale engine 620 resizes the target feature according to the input. At operation 1115, the scale engine 620 negatively scales the target feature so that the size of the target feature decreases as the client device moves or the background digitally moves, as discussed above. At operation 1120, the stabilization engine 625 stabilizes the target feature in its location (e.g., the center of the one or more images) as the background moves.

Figure 12:
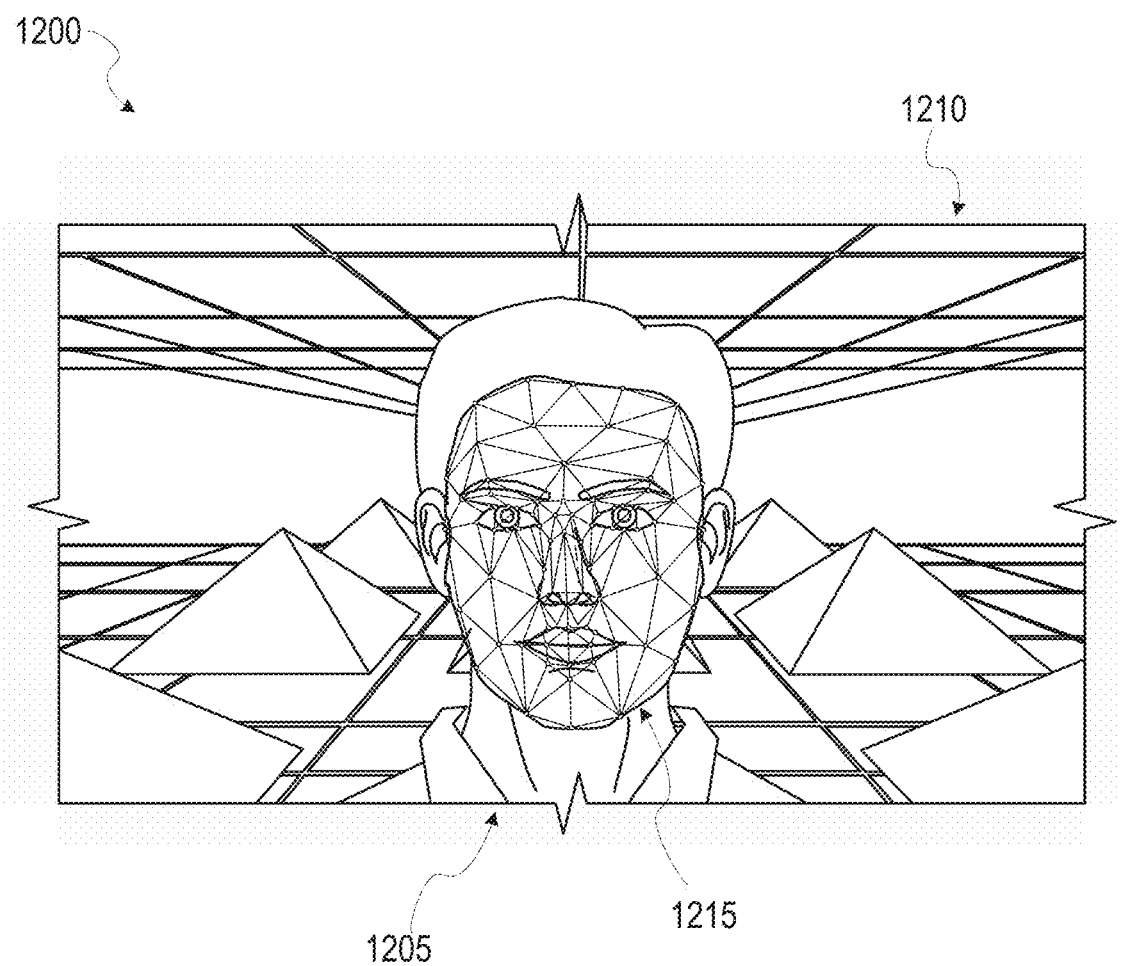
FIG. 12 shows an example image showing an example target feature and background, according to some example embodiments.

FIG. 12 shows an example image 1200 for applying a scaled perspective zoom, according to some example embodiments. The image 1200 may be an image from a live video feed from which the one or more images capturing the scaled perspective zoom effect are generated. As illustrated, the image 1200 comprises a target feature 1205, which is a man (e.g., head, neck, and shoulders of the man). As used herein, the depicted subject is the physical man while the target feature is feature data or image data that corresponds to the pixels used to depict the physical man. The objects of the image 1200 that are not part of the target feature 1205 are a background 1210. As illustrated, the background 1210 depicts objects including the ground upon which pyramids sit, and a ceiling. Further displayed in the image 1200 is a mesh 1215 which the feature engine 610 has generated as part of the face detection in operation 805 in FIG. 8.

Figure 13:
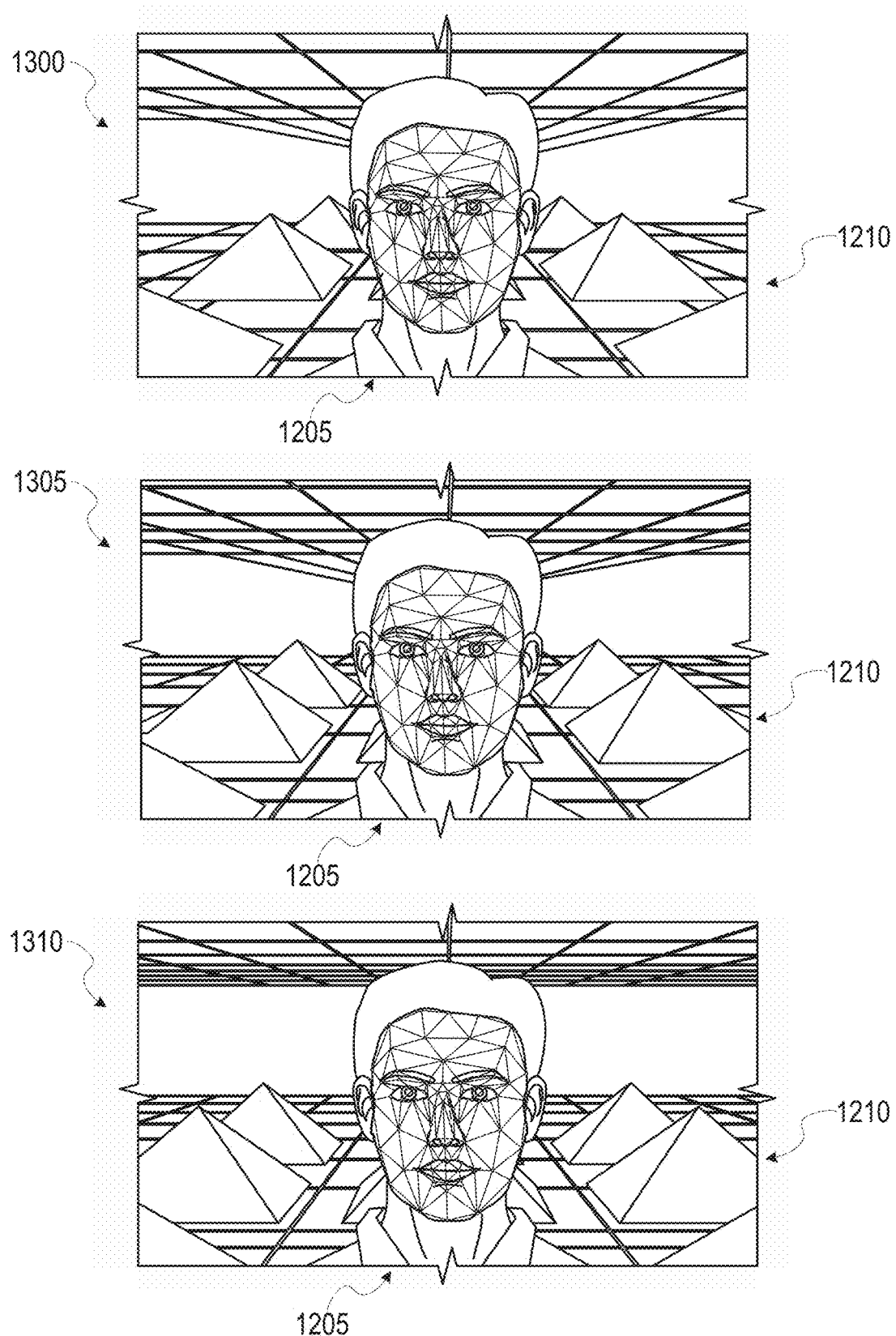
FIG. 13 shows an example of the scaled perspective zoom being implemented, according to some example embodiments.

FIG. 13 shows example images with the perspective zoom applied, according to some example embodiments. Images 1300-1310 are captured from top to bottom sequentially as part of a live feed by an image capture device of the client device 102. The images 1300-1310 may be dynamically displayed on a display device of the client device 102 as they are captured. As illustrated in the example of FIG. 13, the target feature 1205 maintains the same size as the perspective of the background 1210 moves in the images 1300-1310. In particular, for example, the grid lines of the ground and ceiling in the image 1300 approach the vanishing point more quickly than the grid lines of the ground and ceiling in the image 1310. Further, the perspective change is apparent in the furthest pyramids, as they appear closer to the head (and vanishing point) in the image 1300 than in the image 1305. As appreciated by one of ordinary skill in the art, the vanishing point is a far-off point in space (not depicted) that the gridlines tend to (e.g., the point at which parallel lines appear to intersect).

In the images 1300-1310, the background 1210 may move due to the client device 102 physically moving closer to the depicted subject (e.g., the man corresponding to the target feature 1205). Although only three images—e.g., image 1300, image 1305, and image 1310—are shown as the one or more images capturing the scaled perspective zoom effect, it is to be appreciated that the one or more images may contain any number of sequential images captured as a video feed. The number of images can correspond to the frame rate of the client device and an amount of time that a record button is depressed on the client device. For example, if the client device records 30 frames per second, and the record button is depressed for five seconds as the client device moves closer to the physical man, then the number of images capturing the scaled perspective zoom is 150. In some example embodiments, the recording of the one or more images occurs automatically after the target feature is detected. Further, according to some example embodiments, the recording of the one or more images and/or the scaling of the target feature may be triggered by motion components 1734 of the client device 102, as discussed in further detail with reference to FIG. 17 below.

Figure 14:
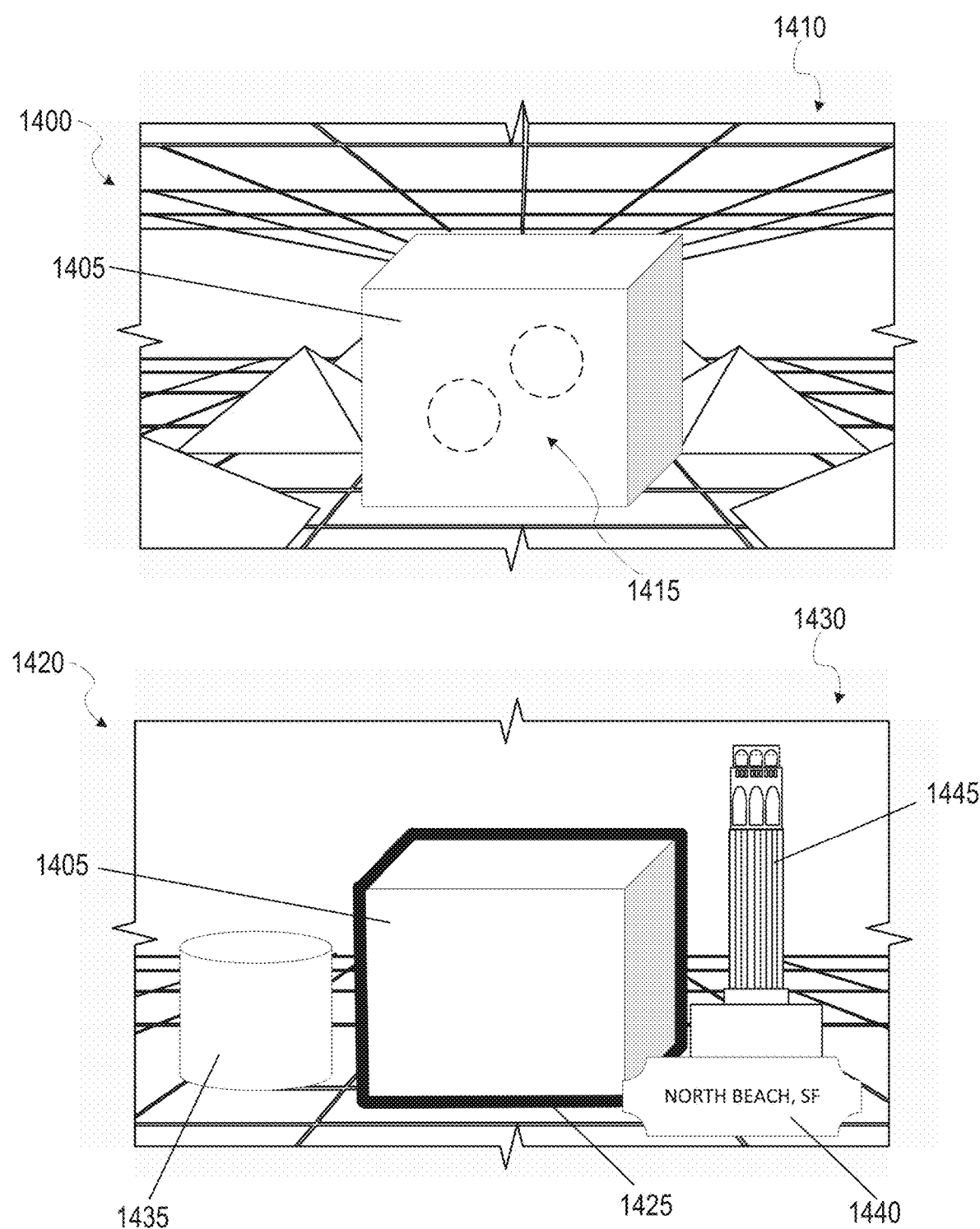
FIG. 14 shows an example of detecting a shape as a target feature and background replacement, according to some example embodiments.

FIG. 14 shows an example of shape detection, according to some example embodiments. As illustrated, an image 1400 includes a background 1410 and a cube 1405, which is a physical object not yet identified as a target object. The user can use a user input, such as a gesture, to instruct the feature engine 610 to perform shape detection in an area indicated by the user input. For example, as indicated by dotted circles 1415, the user uses two of his/her fingers to simultaneously tap on the cube 1405 to indicate to the feature engine 610 to perform shape detection in that area. In response to the gesture, the feature engine 610 performs shape detection (e.g., using edge detection, feature detection, or blob detection) to detect the shape or outline of the cube 1405. In some example embodiments, a user can use his/her finger as a drawing tool to encircle an area on the display device around a shape to be detected. For example, the user may drag his/her finger around the cube 1405 as displayed on the screen of the client device 102 to indicate to the feature engine 610 to perform shape detection within the encircled area. In response to the drag gesture, the feature engine 610 can perform pixel analysis, color analysis, or other types of image feature detection to identify the cube 1405 as a target feature.

After the shape of the cube 1405 is detected, the feature engine 610 tracks the pixels that depict the cube 1405 as a target feature 1425, as indicated by the bold black border around the cube 1405 in an image 1420.

Further illustrated in the image 1420 is added imagery which can replace some or all of the background 1410. In particular, the initial background 1410, which was the physical background physically behind the cube 1405, is replaced with added imagery 1430 (e.g., a replacement background).

The added imagery 1430 can be computer generated. In the example illustrated in the image 1420, the added imagery 1430 includes a complete background replacement image that completely replaces the initial background 1410. For example, the background in the added imagery 1430 displays an open sky with no ceiling. According to some example embodiments, because the added imagery 1430 is computer generated, the perspective can more readily be changed to enable a scaled perspective zoom effect. For example, the scale of the target feature 1425 (corresponding to the physical cube 1405) may be maintained while the perspective of the added imagery 1430 is zoomed out or zoomed in to create a change in perspective. Further, in some example embodiments, the replaced background is not computer generated imagery (CGI) but rather a pre-recorded sequence of a physical real world environment. In those example embodiments, the pre-recorded sequence can replace the background to make it appear as though the target feature is in the foreground of the pre-recorded sequence.

Further, as illustrated in the image 1420, the added imagery 1430 can include one or more three-dimensional (3D) shapes, such as a cylinder 1435. Other examples of three-dimensional added imagery include trees, buildings, cars, and other representations of real-world objects.

Further, according to some example embodiments, the added imagery 1430 includes one or more two-dimensional (2D) objects such as a plaque 1440 and a tower 1445. In some example embodiments, when the client device 102 receives an instruction to perform a scaled perspective zoom, the enhancement engine 635 uses a position component 1738 (e.g., a GPS sensor) to determine the location of the client device 102. Next, the enhancement engine 635 generates added imagery that is specific to the current geographic location of the client device 102. For example, in the example illustrated, the client device 102 is in North Beach, San Francisco, Calif. Accordingly, the plaque 1440 may include text with the name of the area, "North Beach, SF", and the tower 1445 may represent Coit Tower, a popular North Beach destination. In some example embodiments, the added imagery 1430 is pre-generated for different locations around the world and geo-fenced to those specific locations. For example, if the client device 102 is within 50 miles of Venice Beach, Calif., the added imagery 1430 can be a color sign that reads "Venice" and a cartoon sun in the simulated sky behind the cube 1405.

Figure 15:
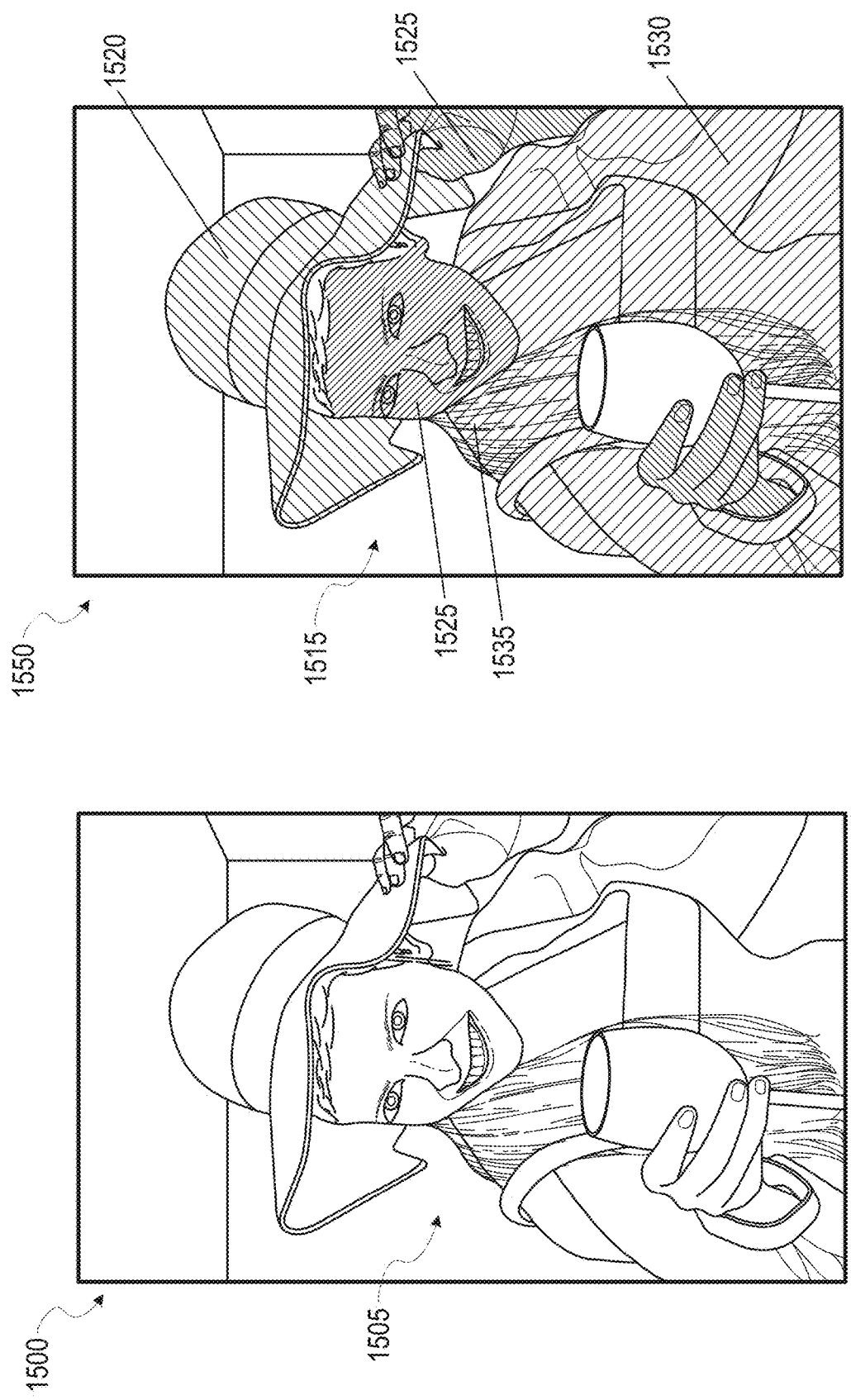
FIG. 15 shows an example of detecting body segments as target features, according to some example embodiments.

FIG. 15 shows an example of body detection, according to some example embodiments. As illustrated, an image 1500 displays a girl 1505 who is holding a glass and touching her hat. The girl 1505 is a physical object that is not yet identified as a target feature. In response to a user input (e.g., operation 710 of FIG. 7 triggering operation 810 of FIG. 8, tapping in the area of the image 1500 in which the girl 1505 is depicted), the feature engine 610 performs body detection to identify the girl 1505 as a target feature 1515 (denoted by shading of different styles) as illustrated in an image 1550. As discussed above, in some example embodiments, the feature engine 610 implements a convolutional neural network to detect and segment different portions of the girl's body. For example, as illustrated, the target feature 1515 can include a hat segment 1520, skin segment(s) 1525 (including both the face and hand areas), a clothing segment 1530, and a hair segment 1535. The different segments of the target feature 1515 can be used to apply different overlay filters (e.g., putting funny glasses over the girl), or can be used for scaling according to some example embodiments. For example, after the target feature 1515 is identified, the skin segment(s) 1525 may undergo positive scaling more quickly than the other segments, thereby resulting in a unique-looking (e.g., zany) scaled perspective zoom effect.

Figure 16:
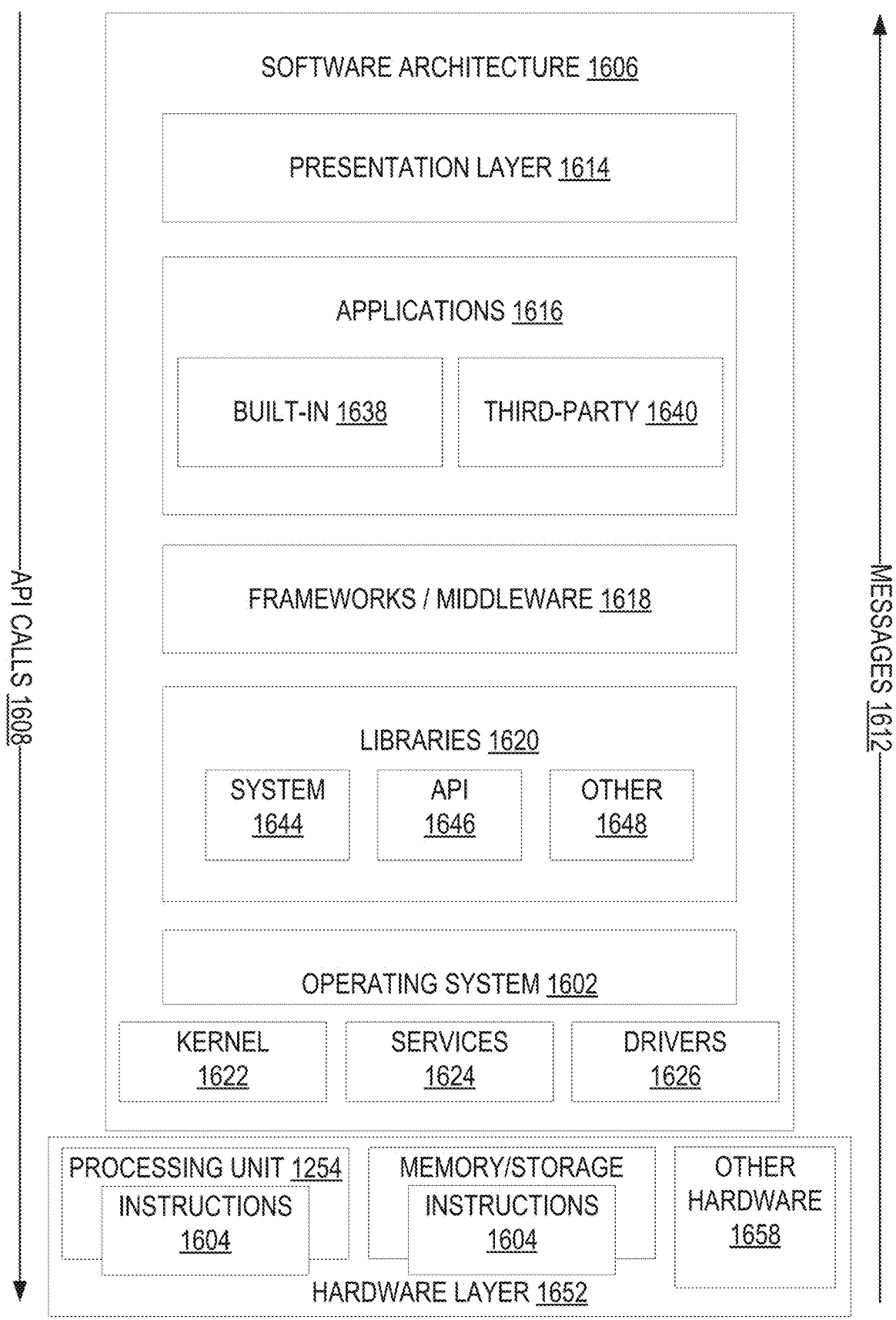
FIG. 16 is a block diagram illustrating a representative software architecture, which may be used in conjunction with various hardware architectures herein described.

FIG. 16 is a block diagram illustrating an example software architecture 1606, which may be used in conjunction with various hardware architectures herein described. FIG. 16 is a non-limiting example of a software architecture, and it will be appreciated that many other architectures may be implemented to facilitate the functionality described herein. The software architecture 1606 may execute on hardware such as a machine 1700 of FIG. 17 that includes, among other things, processors 1704, memory 1714, and I/O components 1718. A representative hardware layer 1652 is illustrated and can represent, for example, the machine 1700 of FIG. 17. The representative hardware layer 1652 includes a processing unit 1654 having associated executable instructions 1604. The executable instructions 1604 represent the executable instructions of the software architecture 1606, including implementation of the methods, components, and so forth described herein. The hardware layer 1652 also includes memory and/or storage modules memory/storage 1656, which also have the executable instructions 1604. The hardware layer 1652 may also comprise other hardware 1658.

In the example architecture of FIG. 16, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke application programming interface (API) calls 1608 through the software stack and receive a response in the form of messages 1612. The layers illustrated are representative in nature and not all software architectures have all layers. For example, some mobile or special-purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than by interfacing directly with the underlying operating system 1602 functionality (e.g., kernel 1622, services 1624, and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media formats such as MPEG4, H.264, MP3, AAC, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. The third-party applications 1640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1640 may invoke the API calls 1608 provided by the mobile operating system (such as the operating system 1602) to facilitate functionality described herein.

The applications 1616 may use built-in operating system functions (e.g., kernel 1622, services 1624, and/or drivers 1626), libraries 1620, and frameworks/middleware 1618 to create user interfaces to interact with users of the system. Alternatively, or additionally, in some systems interactions with a user may occur through a presentation layer, such as the presentation layer 1614. In these systems, the application/component "logic" can be separated from the aspects of the application/component that interact with a user.

Figure 17:
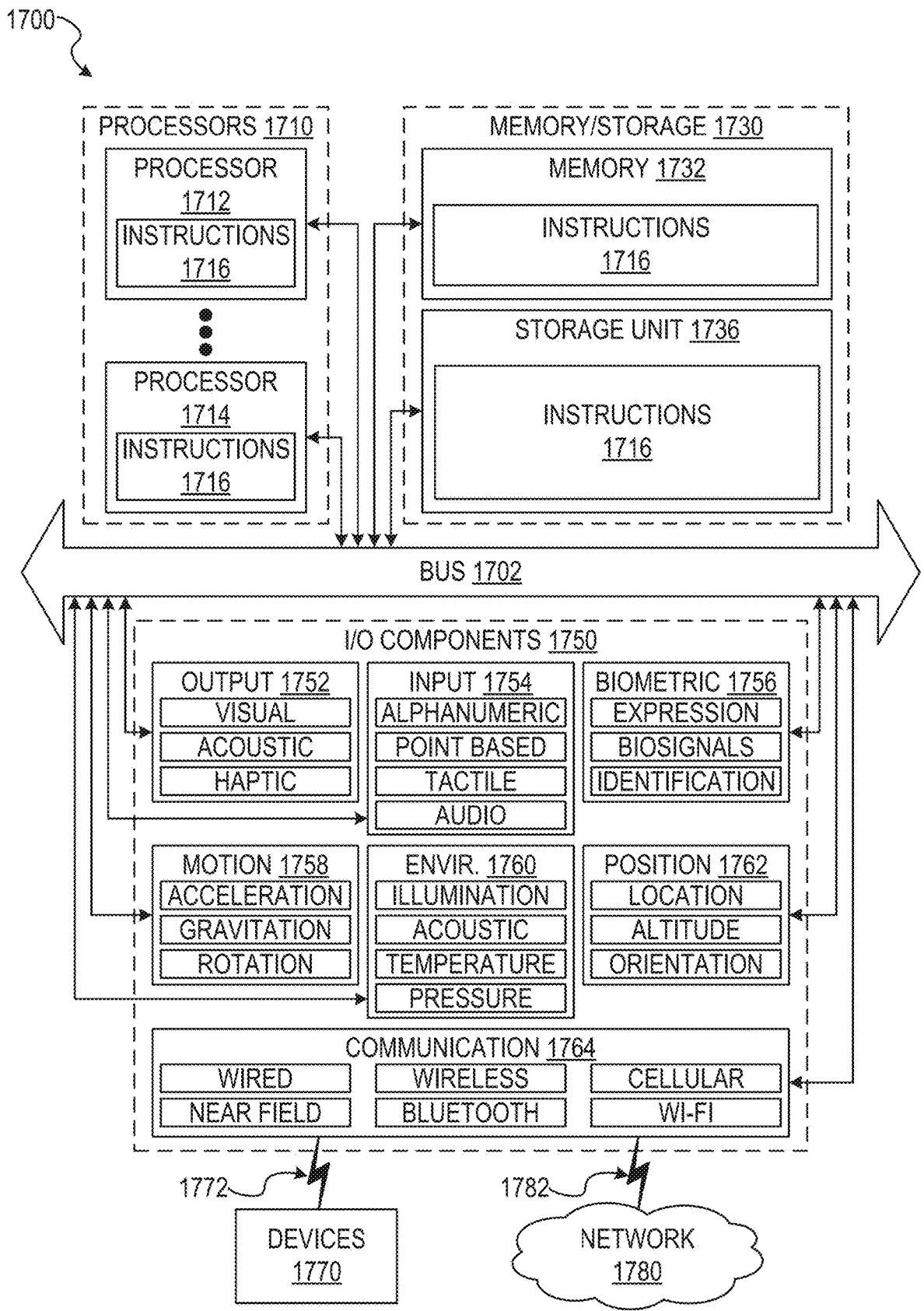
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of the processors 1704 are examples of machine-readable media.

The I/O components 1718 may include a wide variety of components to receive input, provide output, produce output, transmit information, exchange information, capture measurements, and so on. The specific I/O components 1718 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various example embodiments, the I/O components 1718 may include output components 1726 and input components 1728. The output components 1726 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1718 may include biometric components 1730, motion components 1734, environment components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 may include acceleration sensor components (e.g., accelerometer), gravitation sensor components, rotation sensor components (e.g., gyroscope), and so forth. The environment components 1736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via a coupling 1722 and a coupling 1724 respectively. For example, the communication components 1740 may include a network interface component or other suitable device to interface with the network 1732. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a Universal Serial Bus (USB)).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1740, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
generating an image using an image sensor of a user device,
generating, using a convolutional neural network, image feature areas for different image features in the image;
identifying, on the user device, a target image feature from one of the image feature areas, the target image feature corresponding to a physical object depicted in the image;
resizing the target image feature;
generating a zoom video sequence by maintaining the scaling of the resized target image feature in the zoom video sequence without maintaining the scaling of image features areas that are not the target image feature such that the resized target image feature covers the depiction of the physical object in the zoom video sequence as the depiction of the physical object diminishes in size due to the user device moving closer to or away from the physical object; and
storing the zoom video sequence on the user device.

2. The method of claim 1, further comprising:
receiving, through a touchscreen of the user device, an instruction to change the target image feature from an initial size to the size that is manipulated by increased scaling in the zoom video sequence.

3. The method of claim 1, wherein the target image feature is identified in response to a user input received through a touchscreen of the user device.

4. The method of claim 1, wherein generating the target image feature comprises applying, by the user device, the convolutional neural network to the image to identify the target image feature.

5. The method of claim 4, wherein the target image feature is a human face.

6. The method of claim 4, wherein the target image feature includes one or more segments of a human body.

7. The method of claim 4, wherein the target image feature is a shape in the one or more images.

8. The method of claim 7, further comprising: receiving selection of the shape through an input made through a touchscreen of the user device.

9. The method of claim 1, further comprising:
stabilizing the target image feature in the zoom video sequence such that the target image feature remains in an initial area in the zoom video sequence.

10. The method of claim 1, further comprising:
stabilizing the target image feature in the zoom video sequence such that the target image feature remains in an initial area in the zoom video sequence as the user device moves away from the physical object.

11. The method of claim 1, wherein the image is from a live video feed generated by the image sensor of the user device.

12. The method of claim 1, further comprising: transmitting the zoom video sequence to a network server.

13. A user device comprising:
one or more processors;
an image sensor; and
a memory storing instructions that, when executed by the one or more processors, cause the user device to perform operations comprising:
generating an image using the image sensor;
generating, using a convolutional neural network, image feature areas for different image features in the image;
identifying, on the user device, a target image feature from one of the image feature areas, the target image feature corresponding to a physical object depicted in the image;
resizing the target image feature;
generating a zoom video sequence by maintaining the scaling of the resized target image feature in the zoom video sequence without maintaining the scaling of image features areas that are not the target image feature such that the resized target image feature covers the depiction of the physical object in the zoom video sequence as the depiction of the physical object diminishes in size due to the user device moving closer to or away from the physical object; and
storing the zoom video sequence.

14. The user device of claim 13, the operations further comprising:
receiving, through a touchscreen of the user device, an instruction to change the target image feature from an initial size to the size that is manipulated by increased scaling in the zoom video sequence.

15. The user device of claim 13, wherein the target image feature is identified in response to a user input received through a touchscreen of the user device.

16. The user device of claim 13, wherein generating the target image feature comprises applying, by the user device, the convolutional neural network to the image to identify the target image feature.

17. The user device of claim 16, wherein the target image feature is a human face.

18. The user device of claim 16, wherein the target image feature includes one or more segments of a human body.

19. The user device of claim 16, wherein the target image feature is a shape in the one or more images.

20. A non-transitory machine-readable storage device embodying instructions that, when executed by a machine, cause the machine to perform operations comprising:
generating an image using the image sensor;
generating, using a convolutional neural network, image feature areas for different image features in the image;
identifying, on the user device, a target image feature from one of the image feature areas, the target image feature corresponding to a physical object depicted in the image;
resizing the target image feature;
generating a zoom video sequence by maintaining the scaling of the resized target image feature in the zoom video sequence without maintaining the scaling of image features areas that are not the target image feature such that the resized target image feature covers the depiction of the physical object in the zoom video sequence as the depiction of the physical object diminishes in size due to the user device moving closer to or away from the physical object; and
storing the zoom video sequence.

* * * * *